(12) United States Patent
Tong et al.

(10) Patent No.: US 8,126,136 B2
(45) Date of Patent: Feb. 28, 2012

(54) METHOD AND SYSTEM FOR AUTOMATIC SUPERVISOR INTERVENTION IN PROBLEMATIC CALLS IN A CALL CENTER

(75) Inventors: Aaron Tong, San Jose, CA (US); Martin R. Eppel, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 1228 days.

(21) Appl. No.: 11/109,280

(22) Filed: Apr. 19, 2005

(65) Prior Publication Data
US 2006/0233347 A1 Oct. 19, 2006

(51) Int. Cl.
*H04M 3/00* (2006.01)
(52) U.S. Cl. ......... 379/265.06; 379/265.02; 379/265.03
(58) Field of Classification Search ............... 379/133, 379/265.06, 286, 32.01, 100.05
See application file for complete search history.

(56) References Cited

U.S. PATENT DOCUMENTS

| | | | |
|---|---|---|---|
| 5,299,260 A * | 3/1994 | Shaio | 379/266.07 |
| 5,535,256 A | 7/1996 | Maloney et al. | 379/34 |
| 5,696,811 A | 12/1997 | Maloney et al. | 379/34 |
| 5,818,907 A | 10/1998 | Maloney et al. | 379/34 |
| 6,047,060 A | 4/2000 | Fedorov et al. | 379/265 |
| 6,181,776 B1 * | 1/2001 | Crossley et al. | 379/32.01 |
| 6,263,049 B1 | 7/2001 | Kuhn | 379/34 |
| 6,363,145 B1 * | 3/2002 | Shaffer et al. | 379/265.02 |
| 6,408,064 B1 | 6/2002 | Fedorov et al. | 379/265.06 |
| 6,594,470 B1 | 7/2003 | Barnes et al. | 455/67.7 |
| 6,600,821 B1 * | 7/2003 | Chan et al. | 379/265.07 |
| 6,603,854 B1 | 8/2003 | Judkins et al. | 379/265.06 |
| 6,707,904 B1 | 3/2004 | Judkins et al. | 379/265.06 |
| 6,724,887 B1 * | 4/2004 | Eilbacher et al. | 379/265.03 |
| 6,959,078 B1 * | 10/2005 | Eilbacher et al. | 379/265.03 |
| 7,457,404 B1 * | 11/2008 | Hession et al. | 379/265.07 |
| 2001/0012345 A1 * | 8/2001 | Nolting et al. | 379/112.01 |
| 2001/0014143 A1 | 8/2001 | Kuhn | 379/67.1 |
| 2001/0043697 A1 | 11/2001 | Cox et al. | 379/265.06 |
| 2005/0286705 A1 * | 12/2005 | Contolini et al. | 379/265.02 |

* cited by examiner

*Primary Examiner* — Melur Ramakrishnaiah
*Assistant Examiner* — Yosef K Laekemariam
(74) *Attorney, Agent, or Firm* — Baker Botts L.L.P.

(57) ABSTRACT

According to one embodiment of the invention, a method for processing a call in a call center includes monitoring a characteristic of at least a portion of the call, comparing the characteristic to a threshold for the characteristic, and generating a signal indicative of a potential problem call based on the comparison.

47 Claims, 2 Drawing Sheets

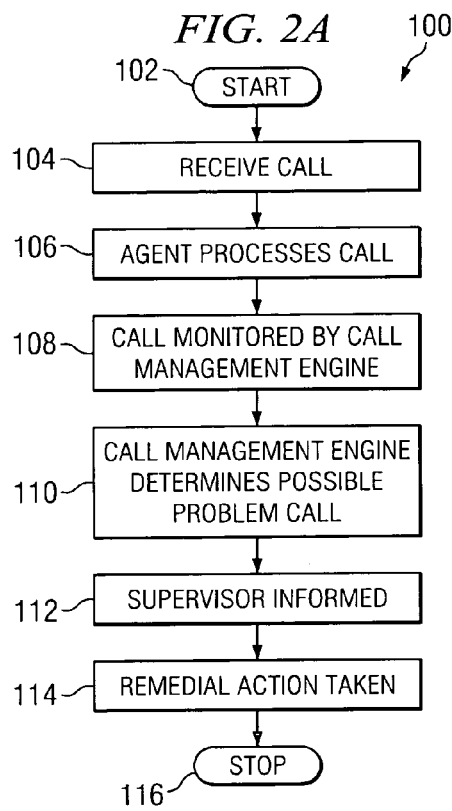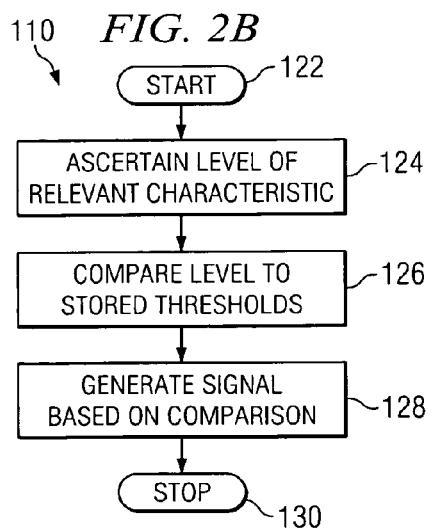

METHOD AND SYSTEM FOR AUTOMATIC SUPERVISOR INTERVENTION IN PROBLEMATIC CALLS IN A CALL CENTER

TECHNICAL FIELD OF THE INVENTION

This invention relates generally to call centers and more particularly to a method and system for automatic supervisor intervention in problematic calls in a call center.

BACKGROUND OF THE INVENTION

In today's society, one of the key factors for judging the performance of any call center is customer satisfaction. Customer satisfaction reflects how well a company is able to deliver it's products and services. Call centers usually provide a way to monitor conversations between agents and callers to ensure quality of service and thus improve customer satisfaction. Through monitoring, a supervisor or more skilled agent can train and assist a less skilled agent's conversation with a caller.

SUMMARY

According to one embodiment of the invention, a method for processing a call in a call center includes monitoring a characteristic of at least a portion of the call, comparing the characteristic to a threshold for the characteristic, and generating a signal indicative of a potential problem call based on the comparison.

Embodiments of the invention provide numerous technical advantages. Some, none, or all embodiments may benefit from the below-described advantages. According to one embodiment, a method and system are provided that automatically alert a supervisor or a senior agent of a potentially troubled call, thus allowing a supervisor to intervene at an earlier stage and avoiding possible customer dissatisfaction. In some embodiments such an automatic system and method may be utilized to better train call center agents.

Other embodiments will be readily apparent to one of skill in the art.

BRIEF DESCRIPTION OF THE FIGURES

For a more complete understanding of the present invention and its advantages, references now made to the following description, taken in conjunction with the accompanying drawings, in which:

FIG. 2A is a flow chart illustrating example steps associated with providing automatic supervisor intervention in a call center; and FIG. 2B is a flow chart illustrating example steps associated with the call management application of FIG. 1C.

DETAILED DESCRIPTION OF EXAMPLE EMBODIMENTS

Figure 1A:
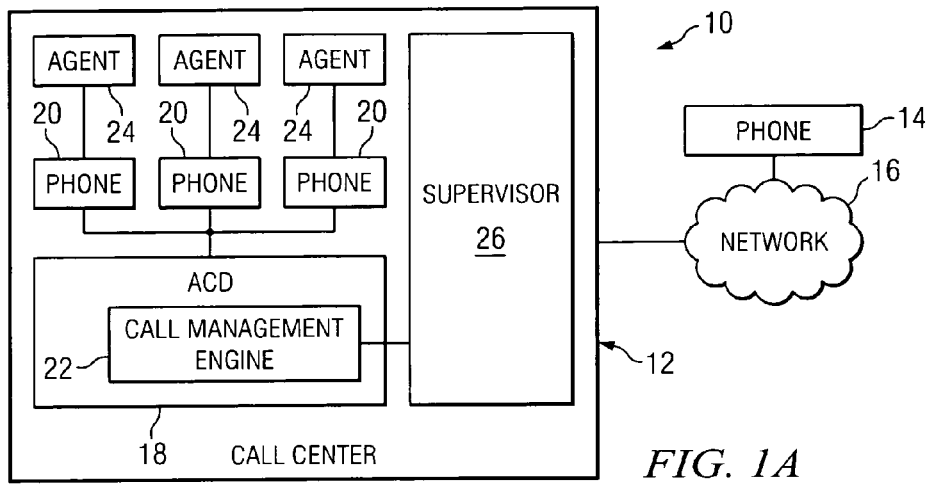
FIG. 1A is schematic diagram illustrating a system for providing automatic supervisor intervention in problematic calls in a call center.

Embodiments of the present invention and its advantages are best understood by referring to FIGS. 1 through 2B of the drawings, like numerals being used for like and corresponding parts of the various drawings.

The teachings of the invention recognize that conventional methods for intervening in problematic calls in a call center are not satisfactory in all respects. For example it is difficult for a supervisor to know which agents to monitor. Choosing a less skilled agent to monitor may be a good option but it may not be the correct one. In a dynamic environment such as call center, the behaviors of agents are unpredictable. If problems arise during a conversation the agent's skill level and behavior will affect whether the call will be completed successfully. In situations where the agent cannot handle a call effectively, the agent may need to consult with his supervisor or more senior agent to resolve the issue. However, the teachings of the invention recognize that this recognition of the need to consult a supervisor may arise too late, leaving a customer with frustration and a negative experience with the call center. Thus, according to the teachings of the invention a method and system are provided that automatically alert a supervisor or senior agent of potentially troubled calls, thus allowing the supervisor to intervene at an earlier stage and avoiding possible customer dissatisfaction.

According to one embodiment, a system automatically provides an alert during a conversation between a call center agent and a caller (or callee in some embodiments) if the call shows signs of a troubled conversation. The system is configured to alert supervisors, or in some instances to warn the agent himself, when a potentially problematic call is detected. The supervisor can then use passive call intervention, such as silent monitoring, or active call intervention to alleviate the situation.

According to one embodiment, an automatic speech recognition server (ASR) or other speech recognition technology is used in conjunction with automatic call distributor (ACD) system to monitor conversations between a caller and an agent for predefined patterns of words and phrases. For example, words and phrases can be configured to represent samples of troubled conversations. When a call is routed to an agent, the conversation is parsed and examined for key words or phrases that are indicative of a potentially problematic call. If there is a match, a supervisor or designated person in the call center may be notified. Notification may be performed by email, page, instant message, or through other suitable techniques. Remedial action can then be taken to address the potentially problematic call, such as passive monitoring or active call intervention.

In another embodiment, voice signals are analyzed for frequency, voice volume, and/or tone. These signals are compared with existing samples to verify elevated agitation or stress in a conversation. As an example, voice pitch changes, increased volume, and frequent interruptions of one party could be used as an indicator of a troubled conversation, raising an alert to a supervisor or other party.

In yet another embodiment, a caller's profile and call history can be used in conjunction with the above-described embodiments, or by itself, to enhance the alerting of a supervisor. For example, an ACD system can scan for calls with previous troubled call history. A caller (or callee in an outbound call center) with a history of troubled conversations may invoke a lower threshold for the alerting of a supervisor than other callers. The call frequency of a caller in a predefined period of time may also be used as an indicator of an enhanced, heightened need for alerting of a supervisor. Other relevant statistics of a particular caller (or callee), who may be identified through a called number or calling number or other means of identification, may also be used. Example embodiments of the invention are described in greater detail below in conjunction with FIGS. 1A through 2B.

FIG. 1A is a schematic diagram illustrating an example system 10 according to the teachings of the invention. System 10 includes a call center 12 coupled to a telephone 14 of a customer through a network 16. In one example implementation, call center 12 is an inbound call center, which receives calls typically from customers of an entity who require information. However, it will be understood that the teachings of the invention are also applicable to outbound call centers that place calls to parties, as well as call centers that perform both outbound and inbound calls.

Call center 12 may receive a call from telephone 14 through network 16. Telephone 14 may be any type of communication device, such as a wireless telephone, landline telephone, IP telephone, or other type of communications device, including those yet to be developed. Network 16 may take any suitable form, including the public switch telephone network (PSTN), an IP network, or any other medium through which telephone 14 may communicate with call center 12.

Call center 12 includes, according to one embodiment, automatic call distributor 18, a plurality of telephones 20, a call management engine 22, a plurality of agents 24, and a supervisor 26. ACD 18 receives a call over network 16 and distributes it to one of the plurality of telephones 20 according to any suitable technique. Telephones 20 may be any type of communication device operable to establish communication with telephone 14 including land line telephones, IP telephones, wireless telephones, and yet to be developed telephones.

Call management engine 22 performs functions associated with automatic detection of a possible problem call and notification of a supervisor or other party of the potential problem call. Call management 22 is illustrated in FIG. 1A as being a portion of automatic call distributor 18; however, it may be implemented as part of telephones 20, as a stand-alone device that is part of call center 12, as a stand-alone device that is remote from call center 12, or through other suitable techniques. According to one embodiment, call management engine 22 is implemented by instructions encoded in software that are executed on a processor; however, other suitable implementations may be used, such as firmware.

Agents 24 are human agents or automated agents that are associated with telephones 20 for handling a call. Supervisor 26 is usually a human but may take an electronic machine form.

According to the teachings of the invention, call management engine 22 automatically detects potentially problematic calls based on examination of a call and automatic identification of particular words, groups of words, certain pitches or tones, change in pitches, volume, word selection or combination of the above. These characteristics of a call may be compared to thresholds at which it is determined a signal indicative of a potential problem call should be transmitted to a supervisor or other personnel.

Figure 1B:
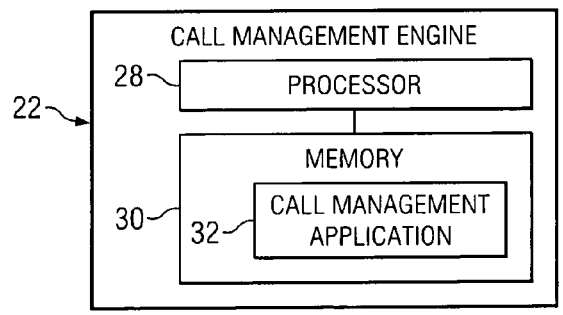
FIG. 1B is a block diagram illustrating example details associated with a call management engine of FIG. 1A.

FIG. 1B is a block diagram illustrating additional details of one example implementation of call management engine 22. In this embodiment, call management engine 22 includes a processor 28 and an associated memory 30. Stored within memory 30 is a call management application 32. Processor 28 may taken any suitable form in this example, including processors typically used with personal computers or as digital signal processors. Memory 30 may be random access, read-only, or other type of memory operable to store a set of instructions for execution by processor 28. Call management application 32 is, in this example, software instructions encoded in memory 30 that are operable to perform necessary functions for detecting the one or more of the above-described characteristics of a call, comparing those characteristics to thresholds, and generating a signal indicative of a potential problem call for receipt by a supervisor or other party. Additional details of one example of call management application 32 are described in greater detail below in conjunction with FIG. 1C.

Figure 1C:
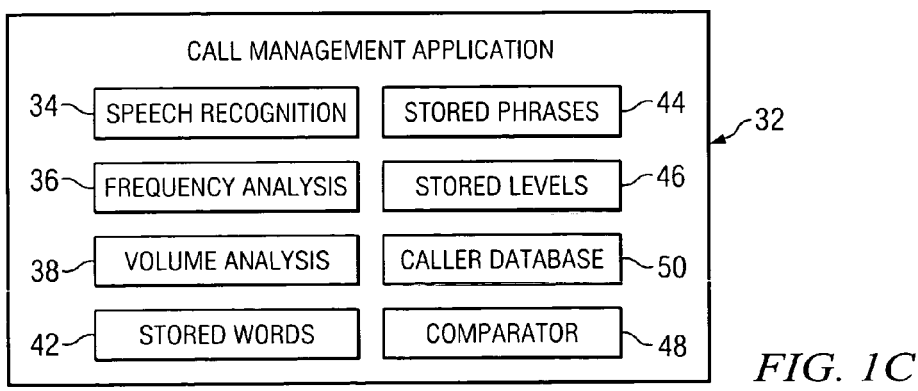
FIG. 1C is a block diagram illustrating example details associated with a call management application of the call management engine of FIG. 1B.

FIG. 1C is a block diagram illustrating example details associated with one embodiment of call management application 32. In this embodiment, call management application 30 includes a number of functional blocks. These functional blocks include a speech recognition block 34, a frequency analysis block 36, a volume analysis block 38, stored words block 42, stored phrases block 44, and stored thresholds block 46, comparator 48, and a caller database 50.

Speech recognition block 34 includes instructions for recognizing verbally spoken words. Recognized words may then be compared, as described in greater detail below, to a stored set of words indicative of a problem call. Speech recognition block 34 may comprise conventional or yet to be developed speech recognition algorithms. Frequency analysis block 36 includes instructions for analyzing the frequency spectrum of a portion of a call for use in determining whether the call is potentially problematic. This may include analysis of the fundamental frequency of a call, also referred to as pitch, and/or analysis of other harmonies. Although frequency analysis is implemented in software in this example, this function could be performed in hardware, such as through a conventional analyzer. Volume analysis block 38 includes instructions for determining relative volume level of a portion of a call.

Stored words 42 stores one or more words that have been determined to be indicative of a potentially problematic call. Stored words may be generated based upon agent experience as well as through analysis of recordings of calls that turn out to be problematic. Stored phrases block 44 is similar to stored words block 42 except that it contains groups of words whose appearance in a particular order are indicative of a potentially problematic call. Stored levels 46 represent levels associated with the various characteristics described above other than stored words or stored phrases that may be indicative of a potentially problematic call. For example, the volume level of a call may be compared to the stored level of a particular volume level. When the stored level is exceeded, a signal may be generated by call management application 32 indicating a potentially problematic call.

Comparator 48 contains instructions for comparing monitored characteristics of at least a portion of a call to associated thresholds. Thresholds used for this comparison may include stored levels 46 as well as be represented by a number of occurrences of a particular stored word 42 or stored phrase 44. In one example, the threshold level for the number of occurrences of a particular stored word or phrase is one, although any suitable number may be used.

Caller database 50 stores information regarding callers (or callees in an outbound call center) that may be indicative of a caller that may be more likely to be involved in a problematic call. Comparator 48 may adjust relevant thresholds in making the determination of whether to notify a supervisor for such callers. Information regarding callers other than that stored in caller database 50 may also be used for this purpose.

FIG. 2A is a flowchart illustrating a method 100 for automatic supervisor intervention in a problematic call. Although method 100 is described in the context of FIGS. 1A through 1C, the method may be implemented in other systems. Method 100 begins at step 102. At step 104 a call from telephone 114 is received over network 16 by call center 12. ACD 18 within call center 12 delivers the received call to an appropriate one of telephones 20, which is manned by a respective agent 24. It should be understood that although the method 100 is described in the context of an incoming call, the teachings of the invention also apply to outgoing calls.

At step 106 agent 24 processes the call. As described above, communications between an agent 24 and the caller may become problematic, at which point it may be desirable to have a supervisor or other more experienced person either monitor or intervene in the call. Thus, at step 108 the call is monitored by the call management engine 22. Call monitoring may be effected, in this example, either by providing the caller's audio portion of the call to call management engine, providing the agent's audio portion of the call to call management engine 22, or both. Providing the audio portions of the call to call management engine 22 may be effected according to conventional techniques for transmitting audio information. In some embodiments, only portions of the call may be monitored, as desired. For example, it may be desirable to only monitor the caller's portion of the call, because the caller's portion of the call may be more indicative of a potential for a problem call.

At step 110 call management engine 22 determines a possible problem call. This may be performed, in one example, as described in greater detail below in conjunction with FIG. 2B. In general, call management engine 22 determines a possible problem call based upon an analysis of the monitored portion of the call. This analysis may involve an analysis of the particular words spoken, a frequency of the audio content of the portion of the call monitored, or the volume of the portion of the call monitored. In addition, each of these characteristics may be analyzed alone or in combination with one or more of the others. For example, call management application 32 of call management engine 22 may look for particular words spoken at a particular volume level. Additional details are described in greater detail below in conjunction with FIG. 2B.

At step 112 a supervisor is informed a potential problematic call identified by call management engine 110. The supervisor 26 may be informed according to any suitable technique including an e-mail, page or through other techniques. At step 114 remedial action may be taken, including call intervention or call monitoring. It will be understood that persons or machinery other than a supervisor may take such remedial action. The method concludes at step 116.

FIG. 2B is a flowchart illustrating additional detail of step 110 of call management engine determining a possible problem call. The method begins at step 122. At step 124 the levels of relevant characteristics of a portion of a call are determined. Such levels may include volume level and frequency (or pitch) of the audio portion of the call. In addition, or alternatively, the level of particular characteristics may refer to the number of times a particular word is spoken or the number of times a particular phrase is spoken. In one embodiment speaking a particular word or phrase once is enough to invoke generation of a signal indicative of a potential call. The levels of the characteristics of the call may be determined by the relevant portions of call management application 32, or through other suitable device.

At step 126 the ascertained levels of portions of the call are compared to stored thresholds, such as the thresholds stored at components 42, 44 and 46 of call management engine 32 (FIG. 1C). An example comparison is a comparison of an ascertained volume level of a call to a stored volume level. Another example comparison is the comparison of one occurrence of a curse word during the monitored portion of the call to a threshold of one for that curse word. In such a case, one occurrence of the curse word may cause a signal to be generated indicative of a potentially problematic call. As described above, different threshold levels may be used for different callers or callees. For example, lower thresholds may be used for callers who have previously been involved in problematic calls more often than others. Based on the result of the comparison at step 126 a signal is generated at step 128 indicating a potentially problematic call. This signal may used to effect electronic notification of a supervisor or other person or machine. In one example, the signal is the generation of a variable in a computer program, which could effect a change in a display. In another example, the agent himself, as opposed to a supervisor, is informed that the call is potentially problematic. The method 110 concludes at step 130.

Thus, according to the teachings of the invention, the method and system are provided that allow automatic identification of potentially problematic calls. This allows a supervisor or other person to intervene in the call to address any problems before they escalate. The system and method described herein may also be used for training purposes. In one example, the monitored calls may be analyzed retrospectively to determine phrases as well as other call characteristics indicative of a potentially problematic call. Agents may then be informed to be careful when such call characteristics are heard. In addition, the above-described thresholds may be updated to reflect this newly acquired knowledge regarding characteristics of a potentially problematic call.

Although the present invention has been described with several embodiments, a myriad of changes, variations, alterations, transformations, and modifications may be suggested to one skilled in the art, and it is intended that the present invention encompass such changes, variations, alterations, transformations, and modifications as they fall within the scope of the appended claims.

What is claimed is:

1. A method for processing a call in a call center comprising:
   monitoring a characteristic of at least a portion of a call between an agent and a caller;
   accessing a threshold for the characteristic;
   accessing a caller profile associated with the caller from a plurality of caller profiles, the caller profile indicating:
      a number of times the caller has called in a predefined period of time; and
      whether a previous call was a problem call;
   comparing the accessed caller profile to the plurality of caller profiles to determine whether the caller associated with the accessed caller profile has been involved in problematic calls more often than callers associated with the plurality of caller profiles;
   based on the determination, lowering the accessed threshold for the characteristic;
   comparing the characteristic to the lowered threshold for the characteristic;
   transmitting, based on the comparison and the caller profile, an alert signal indicative of a potential problem call to a supervisor while the call is ongoing; and
   connecting, based on the comparison, a telephone associated with the supervisor to the call between the agent and the caller while the call is ongoing.

2. The method of claim 1, wherein the characteristic is selected from the group consisting of pitch, frequency, volume, and word selection.

3. The method of claim 2, wherein word selection comprises a word pattern selection.

4. The method of claim 2, wherein word selection comprises a single word selection.

5. The method of claim 1, wherein the at least a portion of the call comprises verbal statements by the caller.

6. The method of claim 1, wherein the at least a portion of the call comprises verbal statements by the agent.

7. The method of claim 1, wherein the characteristic comprises a volume level of a voice.

8. The method of claim 1, wherein the characteristic comprises pitch.

9. The method of claim 1, wherein the characteristic comprises a frequency of a voice.

10. The method of claim 1, wherein the characteristic comprises word selection.

11. The method of claim 1, wherein monitoring comprises monitoring by a device selected from the group consisting of a speech recognition system, a frequency analyzer, and a volume level detector.

12. The method of claim 1, and further comprising monitoring the call by the supervisor in response to transmitting the signal.

13. The method of claim 1, wherein comparing comprises comparing by a computer.

14. The method of claim 1, and further comprising taking remedial action to address the potential problem call in response to transmitting the signal.

15. An apparatus for use in processing a call in a call center comprising:
a processor; and
software encoded in media operable when executed on the processor to:
monitor a characteristic of at least a portion of the call between an agent and a caller;
access a threshold for the characteristic;
access a caller profile associated with the caller from a plurality of caller profiles, the caller profile indicating:
a number of times the caller has called in a predefined period of time; and
whether a previous call was a problem call;
compare the accessed caller profile and the plurality of caller profiles to determine whether the caller associated with the accessed caller profile has been involved in problematic calls more often than callers associated with the plurality of caller profiles;
based on the determination, lower the accessed threshold for the characteristic;
compare the characteristic to the lowered threshold for the characteristic;
transmit, based on the comparison and the caller profile, an alert signal indicative of a potential problem call to a supervisor while in the call is ongoing; and
connect, based on the comparison, a telephone associated with the supervisor to the call between the agent and the caller while the call is ongoing.

16. The apparatus of claim 15, wherein the characteristic is selected from the group consisting of pitch, frequency, volume, and word selection.

17. The apparatus of claim 16, wherein word selection comprises a word pattern selection.

18. The apparatus of claim 16, wherein word selection comprises a single word selection.

19. The apparatus of claim 15, wherein the at least a portion of the call comprises verbal statements by the caller.

20. The apparatus of claim 15, wherein the at least a portion of the call comprises verbal statements made by the agent.

21. The apparatus of claim 15, wherein the characteristic comprises a volume level of a voice.

22. The apparatus of claim 15, wherein the characteristic comprises pitch.

23. The apparatus of claim 15, wherein the characteristic comprises a frequency of a voice.

24. The apparatus of claim 15, wherein the characteristic comprises word selection.

25. A system for use in processing a call in a call center comprising:
a telephone for receiving a call from a caller to an agent or placing a call from the agent to the caller; and
a call analysis engine in communication with the telephone and operable to:
monitor a characteristic of at least a portion of the call between the agent and the caller;
access a threshold for the characteristic;
access a caller profile associated with the caller from a plurality of caller profiles, the caller profile indicating:
a number of times the caller has called in a predefined period of time; and
whether a previous call was a problem call;
compare the accessed caller profile and the plurality of caller profiles to determine whether the caller associated with the accessed caller profile has been involved in problematic calls more often than callers associated with the plurality of caller profiles;
based on the determination, lower the accessed threshold for the characteristic;
compare the characteristic to the lowered threshold for the characteristic;
transmit, based on the comparison and the caller profile, an alert signal indicative of a potential problem call to a supervisor while the call is in progress; and
connect, based on the comparison, a telephone associated with the supervisor to the call between the agent and the caller while the call is in progress.

26. The system of claim 25, wherein the characteristic is selected from the group consisting of pitch, frequency, volume, and word selection.

27. The system of claim 26, wherein word selection comprises a word pattern selection.

28. The system of claim 26, wherein word selection comprises single word selection.

29. The system of claim 25, wherein the at least a portion of the call comprises verbal statements by the caller.

30. The system of claim 25, wherein the at least a portion of the call comprises verbal statements by the agent.

31. The system of claim 25, wherein the characteristic comprises a volume level of a voice.

32. The system of claim 25, wherein the characteristic comprises pitch.

33. The system of claim 25, wherein the characteristic comprises a frequency of a voice.

34. The system of claim 25, wherein the characteristic comprises word selection.

35. The system of claim 25, wherein the call analysis engine is formed integral with the telephone.

36. The system of claim 25, wherein the call analysis engine is formed separate from the telephone.

37. Apparatus for use in processing a call in a call center comprising:
means for monitoring a characteristic of at least a portion of a call between an agent and a caller;
means for accessing a threshold for the characteristic;

means for accessing a caller profile associated with the caller from a plurality of caller profiles, the caller profile indicating:
 a number of times the caller has called in a predefined period of time; and
 whether a previous call was a problem call;
means for comparing the accessed caller profile and the plurality of caller profiles determine whether the caller associated with the accessed caller profile has been involved in problematic calls more often than callers associated with the plurality of caller profiles;
means for, based on the determination, lower the accessed threshold for the characteristic;
means for comparing the characteristic to the lowered threshold for the characteristic;
means for transmitting, based on the comparison and the caller profile, an alert signal indicative of a potential problem call to a supervisor while in the call is ongoing; and
means for connecting, based on the comparison, a telephone associated with the supervisor to the call between the agent and the caller while the call is ongoing.

38. The apparatus of claim 37, wherein the characteristic is selected from the group consisting of pitch, frequency, volume, and word selection.

39. The apparatus of claim 37, wherein the characteristic comprises word selection.

40. The method of claim 1, wherein transmitting the alert signal comprises transmitting at least one of an email message and an electronic page to the supervisor.

41. The method of claim 1, wherein transmitting the alert signal comprises changing a display associated with the supervisor.

42. The apparatus of claim 15, wherein the software is operable to transmit the alert signal by transmitting at least one of an email message and an electronic page to the supervisor.

43. The apparatus of claim 15, wherein the software is operable to transmit the alert signal by changing a display associated with the supervisor.

44. The apparatus of claim 15, wherein the software is operable to initiate a remedial action taken by the supervisor based on the comparison.

45. The apparatus of claim 25, wherein the call analysis engine is operable to transmit the alert signal by transmitting at least one of an email message and an electronic page to the supervisor.

46. The apparatus of claim 25, wherein the call analysis engine is operable to transmit the alert signal by changing a display associated with the supervisor.

47. The apparatus of claim 25, wherein the call analysis engine is operable to initiate a remedial action taken by the supervisor based on the comparison.

* * * * *